(12) United States Patent
Waldschmidt et al.

(10) Patent No.: US 9,211,881 B2
(45) Date of Patent: Dec. 15, 2015

(54) CONTROL SYSTEM FOR AUXILIARY POWER UNIT OF A VEHICLE

(71) Applicant: Thermo King Corporation, Minneapolis, MN (US)

(72) Inventors: William Waldschmidt, Randolph, MN (US); Gregory R. Truckenbrod, Minneapolis, MN (US); Peter J. Loomis, Roseville, NM (US); Michael D. Turnquist, Maple Grove, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/321,289

(22) Filed: Jul. 1, 2014

(65) Prior Publication Data

US 2014/0316650 A1    Oct. 23, 2014

Related U.S. Application Data

(63) Continuation of application No. 13/484,495, filed on May 31, 2012, now Pat. No. 8,798,857.

(51) Int. Cl.
*B60W 10/30* (2006.01)
*B60K 25/00* (2006.01)
*B60W 10/06* (2006.01)
(Continued)

(52) U.S. Cl.
CPC ............. *B60W 10/06* (2013.01); *B60H 1/3222* (2013.01); *B60K 25/00* (2013.01); *B60W 10/30* (2013.01); *B60W 30/1886* (2013.01);
(Continued)

(58) Field of Classification Search
CPC . B60W 10/06; B60W 30/1886; B60W 10/30; H02J 9/002; B60K 25/00; B60H 3/3222; B60H 2001/3273; B60H 2001/3238
USPC .......................................................... 701/36
See application file for complete search history.

(56) References Cited

U.S. PATENT DOCUMENTS

| 4,099,067 A | 7/1978 | Szentes et al. |
| 4,682,649 A | 7/1987 | Greer |

(Continued)

FOREIGN PATENT DOCUMENTS

| DE | 19704844 | 8/1998 |
| FR | 2516596 | 5/1983 |

(Continued)

OTHER PUBLICATIONS

PCT Search Report and Written Opinion for Application No. PCT/US2013/043226, dated Sep. 4, 2013, 12 pages.

*Primary Examiner* — Mary Cheung
*Assistant Examiner* — Brian P Sweeney
(74) *Attorney, Agent, or Firm* — Hamre, Schumann, Mueller & Larson, P.C.

(57) ABSTRACT

A method of controlling an auxiliary power unit of a vehicle. The auxiliary power unit is in communication with an air conditioning system of the vehicle and includes an engine and an alternator coupled to the engine. The method includes determining a state of a compressor of the air conditioning system, the compressor including an off state and an on state, reducing an alternator load relative to the engine in response to the compressor being varied from the off state to the on state, increasing the alternator load relative to the engine after a predetermined time interval, and simultaneously operating the alternator up to an alternator load capacity and the compressor up to a compressor load capacity.

20 Claims, 4 Drawing Sheets

(51) Int. Cl.
 B60H 1/32 (2006.01)
 B60W 30/188 (2012.01)
 H02J 9/00 (2006.01)

(52) U.S. Cl.
 CPC ........ H02J 9/002 (2013.01); *B60H 2001/3238* (2013.01); *B60H 2001/3273* (2013.01)

(56) References Cited

U.S. PATENT DOCUMENTS

| | | | |
|---|---|---|---|
| 4,762,170 | A | 8/1988 | Nijjar et al. |
| 4,878,465 | A | 11/1989 | Hanson et al. |
| 5,528,901 | A | 6/1996 | Willis |
| 6,534,958 | B1 | 3/2003 | Graber et al. |
| 6,777,822 | B1 | 8/2004 | Sultie et al. |
| 6,857,917 | B1 | 2/2005 | Wasilewski |
| 6,928,972 | B2 | 8/2005 | Biess et al. |
| 7,259,469 | B2 * | 8/2007 | Brummett et al. ......... 290/40 C |
| 7,481,187 | B2 | 1/2009 | Biess et al. |
| 2003/0141049 | A1 * | 7/2003 | Kennedy ................... 165/202 |
| 2005/0167090 | A1 | 8/2005 | Kennedy |
| 2007/0022995 | A1 * | 2/2007 | Marchand et al. ......... 123/179.3 |
| 2009/0063028 | A1 | 3/2009 | Aitchison et al. |
| 2009/0096431 | A1 | 4/2009 | Verschuur |
| 2009/0242301 | A1 | 10/2009 | McClanahan et al. |

FOREIGN PATENT DOCUMENTS

| | | |
|---|---|---|
| JP | 60113040 | 6/1985 |
| JP | 7232605 | 9/1995 |

* cited by examiner

US 9,211,881 B2

CONTROL SYSTEM FOR AUXILIARY POWER UNIT OF A VEHICLE

BACKGROUND

The present invention relates to a vehicle including an auxiliary power unit, and more particularly, to a control system for the auxiliary power unit.

Large tractors or trucks (e.g., semi-tractors) are commonly used to transport cargo within a trailer or container. Existing tractors in a tractor-trailer combination typically include a cabin that is conditioned by multiple mechanically driven vapor compression air conditioning systems. In most tractors, the air conditioning system and other components of the tractor and/or trailer are typically powered by a primary engine of the tractor when the vehicle is operating or moving. Some tractors include an auxiliary power unit that has a secondary engine supplying power to an auxiliary air conditioning system (e.g., compressor) and other components of the tractor when the primary engine is off. Some auxiliary power units also are used to charge tractor batteries (primary or auxiliary) when the primary engine is off.

Existing auxiliary power units are often overloaded when the units simultaneously provide power to the air conditioning system, the batteries, and other components of the truck due to the limited capacities of these auxiliary power units. FIG. 1 illustrates a typical auxiliary power unit load diagram of a prior art auxiliary power unit that has a maximum power output of approximately 5.1 kilowatts (7 horsepower) with two distinct loads—an alternator load and a compressor load. At time $T_0$, the auxiliary power unit is started and the alternator load is applied to the auxiliary power unit. At time $T_1$ (approximately 7 seconds) the alternator reaches a steady state load of approximately 2.9 kilowatts (4 horsepower).

As is common in conventional systems, the compressor load (e.g., approximately 3.7 kilowatts or 5 horsepower) is applied to the auxiliary power unit after and in addition to the alternator load at time $T_2$ (e.g., about 40 seconds after the auxiliary power unit is started). The compressor has a startup load phase in which the load on the auxiliary power unit is increased to approximately 6.6 kilowatts (9 horsepower) because the peak compressor load of 3.7 kilowatts is added to the alternator load of 2.9 kilowatts that is still applied to the auxiliary power unit. The startup load phase is relatively brief (e.g., less than 5 seconds) and then begins its transition to a steady state load at time $T_3$. As illustrated the time $T_3$ is approximately 43 seconds after the auxiliary power unit has started (i.e., the compressor startup load phase is approximately 3 seconds long). The compressor achieves a steady state load of approximately 2.2 kilowatts (3 horsepower) at time $T_4$, and as illustrated, the transition to steady state load lasts about 17 seconds (i.e., 60 seconds after the auxiliary power unit has started).

However, as illustrated in FIG. 1, when the alternator load and the compressor load are applied at the same time to the conventional auxiliary power unit at $T_3$ (i.e., when the compressor transitions toward steady state load), the total load of approximately 6.6 kilowatts (9 horsepower) exceeds the load that can be handled by the auxiliary power unit. As a result of the finite load capability of the auxiliary power unit and the excessive, cumulative loads on the auxiliary power unit cause the alternator or the air conditioning system, or both, to operate at lower than desired thresholds (e.g., between time $T_2$ to time $T_4$).

SUMMARY

In one aspect, the invention provides a method of controlling an auxiliary power unit of a vehicle. The auxiliary power unit is in communication with an air conditioning system of the vehicle and includes an engine and an alternator coupled to the engine. The method includes determining a state of a compressor of the air conditioning system, the compressor including an off state and an on state, reducing an alternator load relative to the engine in response to the compressor being varied from the off state to the on state, increasing the alternator load relative to the engine after a predetermined time interval, and simultaneously operating the alternator up to an alternator load capacity and the compressor up to a compressor load capacity.

In another aspect, the invention provides a control system for a vehicle including a primary engine and a cabin defining a space. The control system includes an auxiliary power unit with an auxiliary engine, an alternator that is operatively coupled to the auxiliary engine and that has an alternator load, and at least a portion of an air conditioning system that has an evaporator positionable in communication with the cabin to condition the space with an airflow and a compressor fluidly connected to the evaporator and operatively connected to the auxiliary engine. A controller selectively operates the auxiliary engine, the alternator, and the compressor when the primary engine is shutdown, and is programmed to detect a compressor parameter and to reduce the alternator load relative to the auxiliary engine in response to the detected compressor parameter. The controller is further programmed to increase the alternator load relative to the auxiliary engine after a predetermined time interval and to simultaneously operate the alternator up to an alternator load capacity and the compressor up to a compressor load capacity.

In another aspect, the invention provides a method of controlling an auxiliary power unit of a vehicle. The auxiliary power unit is in communication with an air conditioning system of the vehicle and includes an engine and an alternator that is coupled to the engine. The method includes determining a state of a compressor that has an off state and an on state defined by a startup mode and a steady-state mode, shedding an alternator load relative to the engine in response to the compressor in the startup mode, restoring the alternator load relative to the engine in response to the compressor being varied from the startup mode to the steady-state mode, and operating the alternator up to an alternator load capacity and the compressor up to a compressor load capacity.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
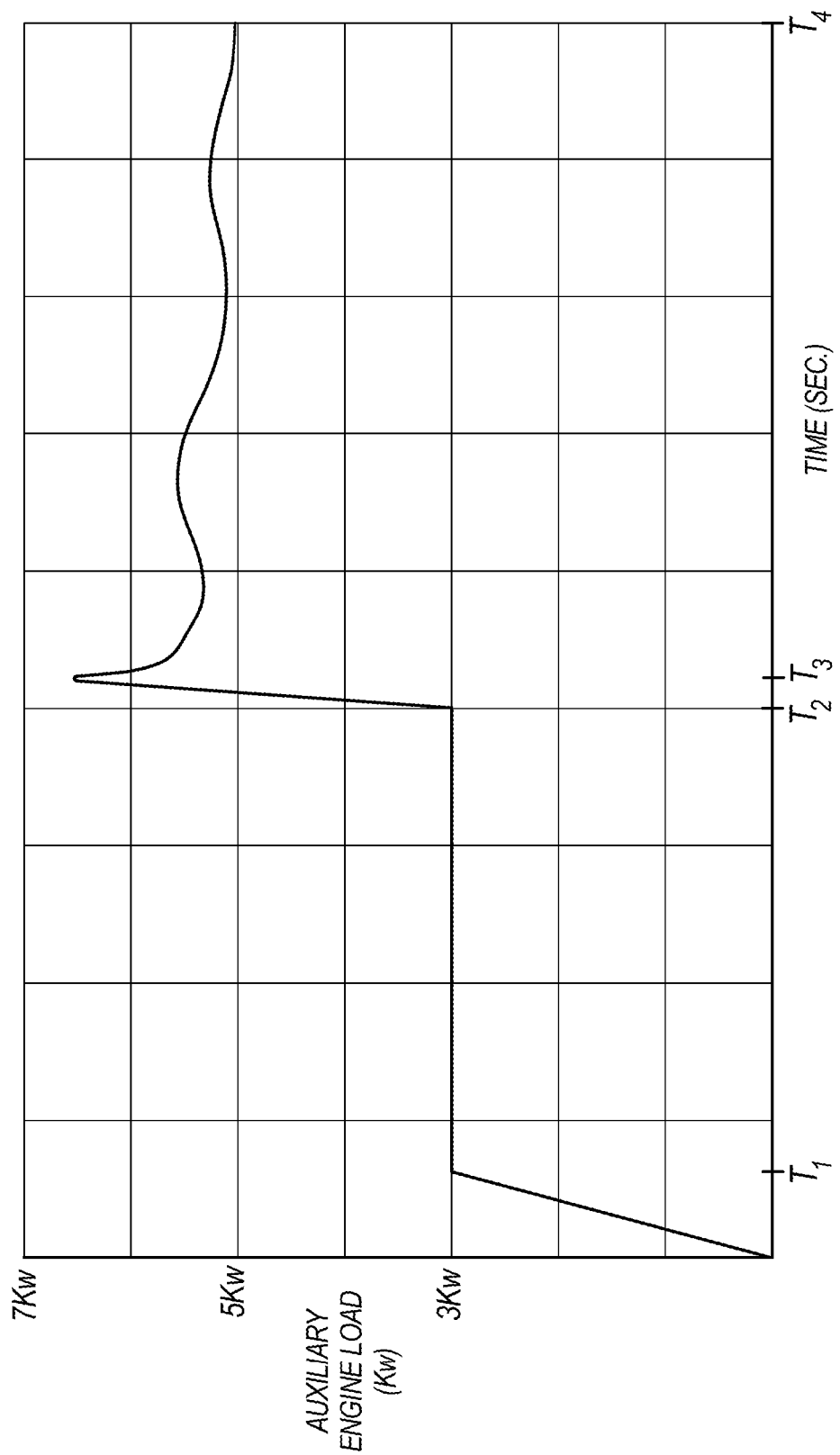
FIG. 1 is a diagram illustrating an alternator load and a compressor load applied to a prior art auxiliary power unit over a period of time.
Figure 2:
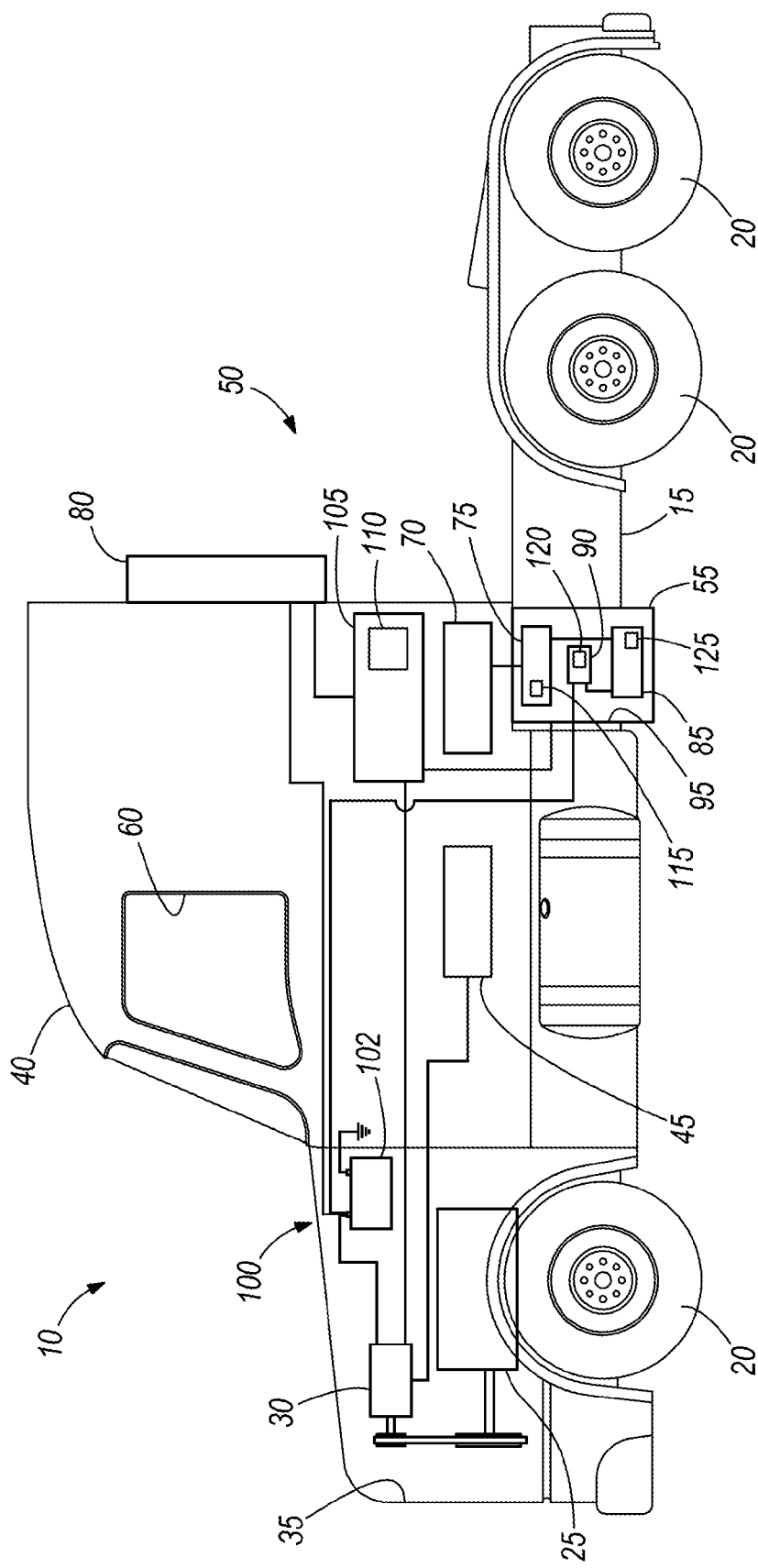
FIG. 2 is a schematic of a vehicle that includes a primary engine, an alternator, an auxiliary power unit having an auxiliary engine, and an air conditioning system embodying the invention.

FIG. 2 shows an exemplary vehicle 10 according to an embodiment of the invention. The vehicle 10 is a semi-tractor or other similar vehicle (e.g., straight truck, van, etc.) that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination.

The vehicle 10 includes a frame 15, wheels 20, a prime mover or primary engine 25, and a primary alternator or direct current ("DC") generator 30. The wheels 20 are rotatably coupled to the frame 15 to permit movement of the vehicle 10. The primary alternator 30 is coupled to the primary engine 25 so that mechanical energy produced by the primary engine 25 can be converted into electrical energy, or electricity. The primary alternator 30 is well known in the art.

The primary engine 25 is coupled to the frame 15 and is disposed in a compartment 35 that is located adjacent a forward end of the vehicle 10. The primary engine 25 is operable in a first mode and a second mode, and includes an on state and an off state. The first mode corresponds to the primary engine 25 being engaged so that the vehicle 10 can be driven. The first mode further corresponds to when the primary engine 25 is idling (e.g., when the primary engine 25 is in the on state), but is not engaged so that the operator can drive the vehicle 10). In other words, the primary engine 25 is operable in the first mode when the primary engine 25 is in the on state.

The primary engine 25 is in the second mode during standby operation of the vehicle 10 (e.g., when the vehicle 10 is parked, etc.). Generally, standby operation of the vehicle 10 corresponds to the primary engine 25 being disengaged. In other words, the primary engine 25 is operating in the second mode when the primary engine 25 in the off state. The primary engine 25 is in communication with one or more of the wheels 20 to power the wheels 20 when the vehicle 10 is in the first mode.

With continued reference to FIG. 2, the vehicle 10 also includes a cabin 40, a primary air conditioning system 45, a secondary or auxiliary air conditioning system 50, and an auxiliary power unit 55. The cabin 40 is supported on the frame 15 rearward of the compartment 35 and defines a space 60. The space 60 can be divided by a partition (not shown) into a driving portion and a sleeping portion, or the space 60 can be a single space without a partition. The primary air conditioning system 45 is coupled to the vehicle 10 and is in communication with the cabin 40 to condition the space 60 when the vehicle 10 is in the first mode. The primary air conditioning system 45 is well known in the art.

The auxiliary air conditioning system 50 also is coupled to the vehicle 10 and is in communication with the cabin 40 to condition the space 60 when the vehicle 10 is in the second mode. The auxiliary air conditioning system 50 is separately operable from the primary air conditioning system 45 to condition air within the cabin 40 using a cooling system and a heating system (not shown).

The cooling system includes an evaporator 70 in communication with the space 60 (e.g., installed under a bunk (not shown) in the cabin 40, or another convenient location), a compressor 75, a condenser 80, and refrigerant or coolant that flows through the evaporator 70, the compressor 75, and the condenser 80 to provide cooling air to the cabin 40. The condenser 80 can be located anywhere on the vehicle 10 (e.g., on the outside of the cabin 40), and can include a fan (not shown) to assist with transferring heat from refrigerant in the condenser 80 to the atmosphere by directing air over the condenser 80. The cooling system also can include other components.

The compressor 75 has a compressor load capacity that is defined by the maximum compression output of the compressor 75. The compressor 75 has an off state in which the compressor 75 has no load (i.e., the compressor 75 has not been energized), and an on state in which the compressor 75 defines a compressor load (i.e., the compressor 75 has been energized). Also, when the compressor 75 is in the on state, the compressor 75 has a startup mode defining a startup or transient peak load (e.g., approximately 5 horsepower or 3.7 kilowatts) and a steady state mode defining a steady state load (e.g., approximately 3 horsepower or 2.2 kilowatts).

Referring to FIG. 2, the auxiliary power unit 55 is coupled to the vehicle 10 and defines a unitary secondary power unit that can be used when the vehicle 10 is in the second mode. The primary engine 25 and the auxiliary power unit 55 can be fluidly connected to the same or different coolant system (not shown) and fuel system (including fuel reservoir).

The auxiliary power unit 55 includes a secondary or auxiliary engine 85 and a secondary or auxiliary alternator 90 for the vehicle 10. The auxiliary engine 85 is disposed in a compartment 95 of the auxiliary power unit 55 and has an off state and on state (i.e., when the primary engine 25 is in the second mode). The auxiliary engine 85 has an off state and an on state and provides a predetermined power output (e.g., approximately 7 horsepower or 5.1 kilowatts). The auxiliary engine 85 is in the off state when the primary engine 25 is in the first mode, and can be in the on state when the primary engine 25 is in the second mode. The compressor 75 is mechanically coupled to the auxiliary engine 85 to provide cooling air to the cabin 40 when the compressor 75 is energized (i.e., when the auxiliary engine 85 and the compressor 75 are in their respective on states).

The auxiliary alternator 90 is mechanically coupled (e.g., via a belt) to the auxiliary engine 85 and converts the mechanical energy from the auxiliary engine 85 to electrical power. The auxiliary alternator 90 has an alternator load capacity (e.g., approximately 4 horsepower or 2.9 kilowatts) that is defined by the maximum power output of the alternator. At any given time when the auxiliary alternator 90 is energized, the auxiliary alternator 90 defines an alternator load that is based on the electrical components of the vehicle 10 being powered by the electricity generated by the auxiliary alternator 90. Generally, the auxiliary alternator 90 has a startup mode in which the alternator load ramps up from a zero load, and a steady state load in which the alternator 90 has a load up to the alternator load capacity.

FIG. 2 shows that an electrical storage system 100 is in electrical communication with the primary alternator 30 and the auxiliary alternator 90. The electrical storage system 100 includes one or more batteries 102 that receive electrical energy from the primary and auxiliary alternators 30, 90 and that power electrical components of the vehicle 10 (e.g., the primary air conditioning system 45, lamps, radio, etc.). When the primary engine 25 is engaged, the primary engine 25 provides a charge to the electrical storage system 100 through the primary alternator 30. When the vehicle 10 is in the second mode (i.e., the primary engine 25 is disengaged) and the auxiliary power unit 55 is engaged, the auxiliary engine 85 provides a charge to the electrical storage system 100 via the auxiliary alternator 90. The electrical storage system 100 discharges electrical power to electrical components of the vehicle 10 that are on when the primary engine 25 is in the second mode and the auxiliary power unit 55 is off.

Figure 3:
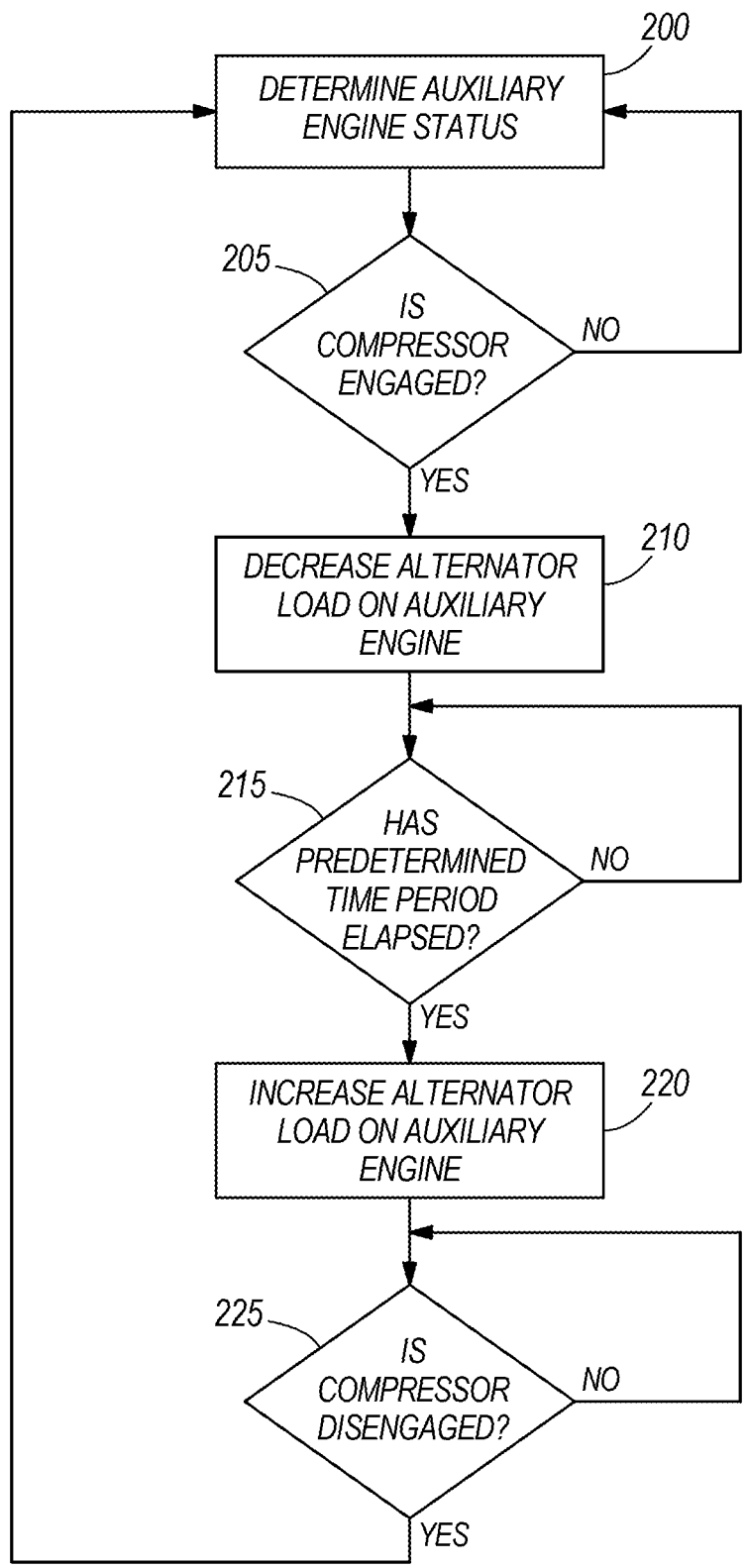
FIG. 3 is a flow chart of control logic for the auxiliary power unit of FIG. 2.

FIGS. 2 and 3 show a control system 105 that is in communication with the vehicle 10. The illustrated control system 105 includes a controller 110 (e.g., with a microprocessor) and a plurality of sensors that communicate signals indicative of parameters of the vehicle 10 (e.g., temperature, pressure, fan speed, switch positions, loss of power, on/off state of the primary engine and the auxiliary power unit 55, etc.) to the microprocessor. Generally, the sensors are in communication with several subsystems of the vehicle 10 such as the primary engine 25, the primary air conditioning system 45, the auxiliary air conditioning system 50, the electrical storage system 100, and the auxiliary power unit 55 to sense various parameters associated with the respective sub-systems. The controller 110 is in communication with these sub-systems and the sensors to control operation of the sub-systems in response to the signals from the sensors.

For example, a first sensor 115 is in communication with the compressor 75 to detect a compressor parameter and to transmit a signal indicative of the compressor parameter to the microprocessor. Generally, the compressor parameter includes one or more conditions of the compressor 75, including the compressor load, whether the compressor 75 is in the off state or the on state, whether the compressor 75 is in the startup mode or the steady state mode, and whether there is an increase or decrease in the compressor load.

A second sensor 120 is in communication with the auxiliary alternator 90 to determine the alternator load and to transmit a signal indicative of the auxiliary alternator load to the microprocessor. A third sensor 125 is in communication with the auxiliary power unit 55 and is operable to deliver a signal indicative of an auxiliary engine parameter to the microprocessor. The auxiliary engine parameter includes conditions of the auxiliary power unit 55, including whether the auxiliary engine 85 is in an on state or an off state. Additional sensors, such as a cabin 40 sensor, an outdoor sensor (not shown), and other vehicle sensors, may also be incorporated in the control system 105.

Figure 4:
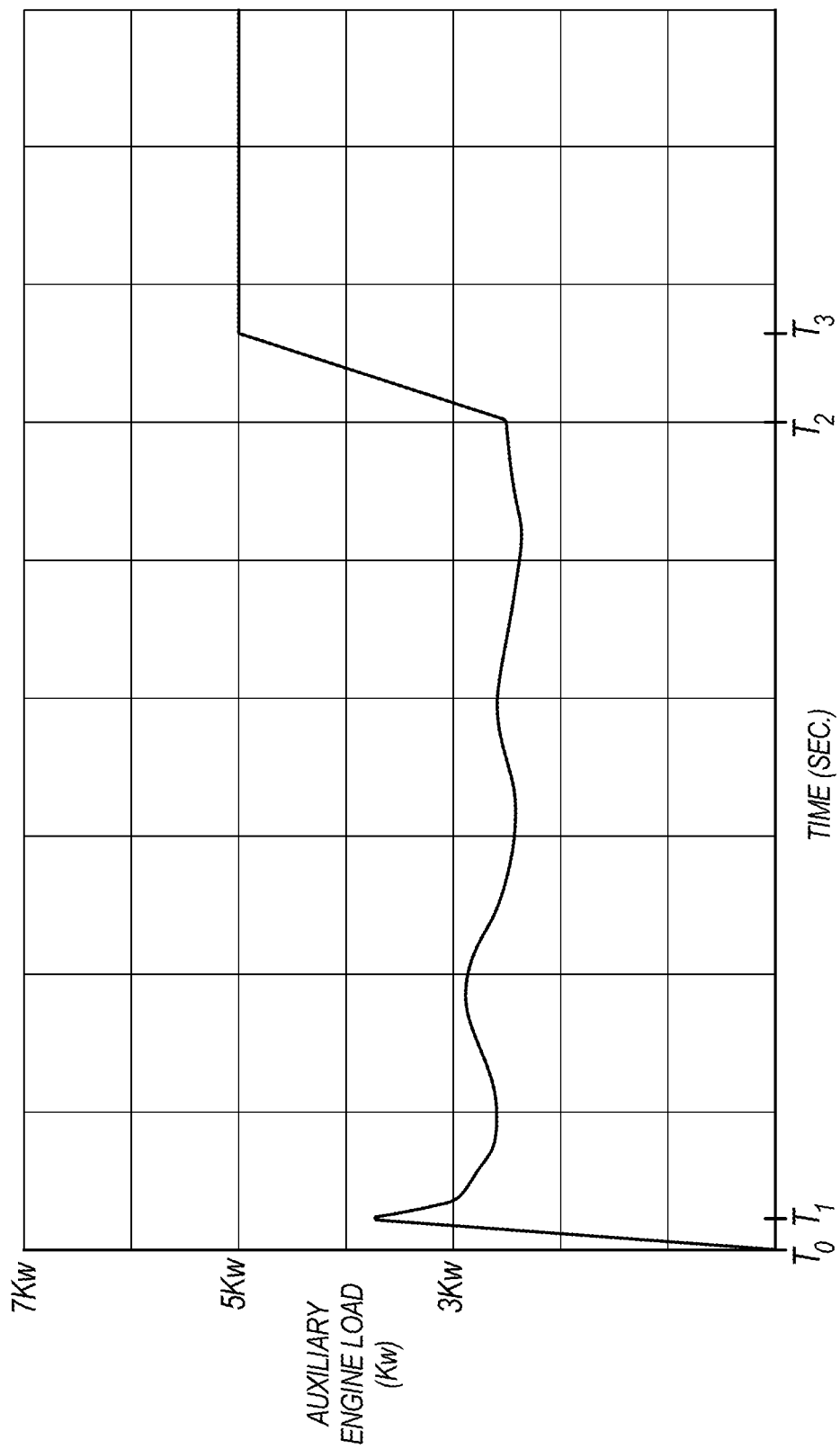
FIG. 4 is a diagram illustrating how the control logic of FIG. 3 applies an alternator load and a compressor load to the auxiliary power unit.

The controller 110 is in communication with the primary alternator 30 and the auxiliary power unit 55 and controls the auxiliary air conditioning system 50 and the auxiliary power unit 55. In particular, FIGS. 3 and 4 illustrate exemplary control logic that is programmed into the control system 105 to control how the auxiliary alternator load and the compressor load are applied to the auxiliary engine 85. Although not described, the control system 105 can include additional control logic.

The control logic discussed with reference to FIGS. 3 and 4 is applied to the vehicle 10 with the auxiliary engine 85 having an exemplary predetermined power output of approximately 7 horsepower or 5.1 kilowatts, the auxiliary alternator 90 having an exemplary alternator load capacity of approximately 4 horsepower or 2.9 kilowatts, and the compressor 75 having an exemplary startup or transient peak load of approximately 5 horsepower or 3.7 kilowatts and an exemplary steady state load of approximately 3 horsepower or 2.2 kilowatts. It will be appreciated that the predetermined power output of the auxiliary engine 85 can be higher or lower than 7 horsepower, that the auxiliary alternator load capacity can be higher or lower than 4 horsepower, that the compressor peak load can be higher or lower than 5 horsepower, and that the compressor steady state load can be higher or lower than 3 horsepower while staying within the scope of the invention.

Referring specifically to FIG. 3, the controller 110 determines the status of the auxiliary engine 85 at step 200. In particular, the controller 110 determines whether the auxiliary engine 85 is in the off state or the on state. Generally, the auxiliary alternator load is applied to the auxiliary engine 85 a short time (e.g., 10 seconds) after the status of the auxiliary engine 85 changes to the on state. At step 205, the controller 110 determines whether the compressor 75 is energized. If "No," the control process returns to step 200 to continue monitoring the status of the auxiliary engine 85. If the controller 110 determines the compressor 75 has been energized (i.e., "Yes" at step 205), the controller 110 decreases the alternator load on the auxiliary engine 85 (step 210). For example, the controller 110 can decrease the alternator load to a lower non-zero value or to a zero value to minimize the increase of the load on the auxiliary engine 85 and so that the compressor 75 can achieve a steady state load before the entire alternator and compressor loads are both applied to the auxiliary engine 85.

At step 215, the controller 110 determines whether a predetermined time (e.g., 20 seconds, 30 seconds, 60 seconds, 2 minutes, etc.) has elapsed since the alternator load was decreased. In some cases, the predetermined time can correspond to the time needed for the compressor 75 to reach steady state load. If the predetermined time has not elapsed (i.e., "No" at step 215), the process continues to evaluate whether the predetermined time has elapsed. When the predetermined time has elapsed (i.e., "Yes" at step 215), the controller 110 increases the alternator load on the auxiliary engine 85 back to the steady state or full load at step 220.

At step 225, the controller 110 determines whether the compressor 75 is de-energized or disengaged (i.e., the compressor 75 is in the off state). If the controller 110 determines that the compressor 75 is not disengaged at step 225 (i.e., "No" at step 225), the process continues to evaluate whether the compressor 75 has been disengaged. In some cases, the compressor 75 being in the off state is indicative of the auxiliary air conditioning system 50 being disengaged or off. In other cases, the air conditioning system 50 is still operable when the compressor 75 is in the off state.

If the controller 110 determines that the compressor 75 is disengaged at step 225 (i.e., "Yes" at step 225), the controller 110 continues to operate the auxiliary engine 85 in the on or off state and the auxiliary alternator 90 up to the alternator load capacity as determined by the requirements of the system. The process then returns to step 200 and repeats.

FIG. 4 illustrates an auxiliary power unit 55 load diagram of the auxiliary power unit 55 incorporating the control logic of the control system 105 described with regard to FIG. 3. At time $T_0$, the auxiliary power unit 55 is started and the controller 110 determines whether the compressor 75 is in the on state (corresponding to step 205 in FIG. 3). As illustrated, when the compressor 75 is engaged (i.e., varied from the off state to the on state), the controller 110 reduces the alternator load to a zero value before the compressor load increases to the startup or transient peak load between time $T_0$ and time $T_1$ (e.g., approximately 3 seconds after time $T_0$). Between time $T_1$ and time $T_2$ (e.g., approximately 60 seconds after time $T_0$), the compressor 75 achieves or substantially achieves steady state load.

At time $T_2$, the controller 110 increases or adds the auxiliary alternator load back onto the auxiliary engine 85. As illustrated, the time $T_2$ corresponds to the predetermined time that has elapsed since the alternator load was decreased to zero. The time between time $T_2$ and time $T_3$ corresponds to the startup mode of the auxiliary alternator 90. At time $T_3$ (e.g., approximately 7-10 seconds after time $T_2$), the alternator load returns to the full steady state load such that the auxiliary alternator 90 can operate up to capacity. Thereafter, the controller 110 operates the auxiliary power unit 55 up to capacity to accommodate the total load on the auxiliary power unit 55 (e.g., corresponding to the total of the auxiliary alternator load and the compressor load). As discussed and illustrated, the control system 105 operates the auxiliary power unit 55 continuously from time $T_0$ to time $T_3$ without exceeding the total power output of the auxiliary engine 85.

The control system 105 reduces or eliminates the load of the auxiliary alternator 90 whenever the compressor 75 is initially engaged, which reduces or removes the ability of the auxiliary alternator 90 to provide power, for example, to the batteries (i.e., load the auxiliary engine 85). After the predetermined time (i.e., time $T_2$ in FIG. 4—after the compressor 75 has achieved steady state load), the control system 105 permits the auxiliary alternator 90 to operate at capacity to charge the batteries 102 and/or other electrical equipment of the vehicle 10. Stated another way, the control system 105 temporarily sheds the load on the auxiliary engine 85 to minimize the total load on the auxiliary engine 85 when both the auxiliary alternator 90 and the compressor 75 are operating at the same time during startup of the auxiliary air conditioning system 50. Applying the compressor load during startup before or in lieu of the alternator load lowers the overall peak engine power requirements of the auxiliary engine 85.

The alternator load can be applied and removed relative to the auxiliary engine 85 anytime while the auxiliary engine 85 is running to accommodate the compressor load being applied to the auxiliary engine 85 when the compressor 75 changes from the off state to the on state. In some constructions, the control system 105 applies and removes the auxiliary alternator load relative to the auxiliary engine 85 in view of the state of the compressor 75 and also in view of the state of charge of the electrical storage system 100. By applying the alternator load to the auxiliary engine 85 after the compressor load when the compressor 75 is engaged, the overall load on the auxiliary engine 85 can be lowered to reduce engine emissions and to minimize the amount of power output needed by the auxiliary engine 85 to provide power to the vehicle 10.

Various features and advantages of the invention are set forth in the following claims.

The invention claimed is:

1. A method of controlling an auxiliary power unit, the auxiliary power unit configured to energize a compressor and the auxiliary power unit including an engine and an alternator coupled to the engine, the method comprising:
   determining a state of the compressor, the compressor including an off state and an on state; and
   increasing an alternator load of the alternator relative to the engine to an alternator load capacity while the compressor is in the on state.

2. The method of claim 1, further comprising operating the alternator up to the alternator load capacity when the compressor is in the off state.

3. The method of claim 1, further comprising selectively charging an electrical power storage system of the vehicle via the engine when the compressor is in the off state.

4. The method of claim 3, further comprising selectively charging the electrical power storage system after a predetermined time interval from when the alternator load is decreased while the compressor is in the on state.

5. The method of claim 3, further comprising disconnecting the electrical power storage system from the engine in response to the compressor being varied from the off state to the on state.

6. The method of claim 1, further comprising
   starting the auxiliary engine; and
   delaying the determination step until expiration of a second predetermined time interval.

7. The method of claim 1, further comprising initially reducing the alternator load relative to the engine in response to the compressor being varied from the off state to the on state.

8. The method of claim 7, wherein reducing the alternator load includes removing the alternator load from the engine.

9. The method of claim 1, further comprising simultaneously operating the alternator up to the alternator load capacity and the compressor up to a compressor load capacity.

10. A control system for controlling a primary engine, the control system comprising:
    an auxiliary power unit including an auxiliary engine configured to energize a compressor, an alternator operatively coupled to the auxiliary engine and having an alternator load;
    a controller selectively operating the auxiliary engine, the alternator, and the compressor when the primary engine is shutdown, the controller programmed to detect a compressor parameter and increase the alternator load of the alternator relative to the auxiliary engine to an alternator load capacity while the compressor is in the on state.

11. The control system of claim 10, wherein the compressor parameter includes the compressor being varied from an off state to an on state.

12. The control system of claim 11, wherein the controller is programmed to remove the alternator load from the auxiliary engine in response to the compressor being varied from the off state to the on state.

13. The control system of claim 12, wherein the auxiliary engine is in communication with an electrical power storage system of the vehicle via the alternator to selectively charge the electrical power storage system, and wherein the electrical power storage system is disconnected from the auxiliary engine in response to the compressor being varied from the off state to the on state.

14. The control system of claim 13, wherein the electrical power storage system remains disconnected from the auxiliary engine during a predetermined time interval from when the alternator load is decreased while the compressor is in the on state.

15. The control system of claim 13, wherein the electrical power storage system is reconnected to the auxiliary engine after the predetermined time interval from when the alternator load is decreased while the compressor is in the on state.

16. The control system of claim 10, wherein the controller is programmed to selectively activate the auxiliary power unit when the primary engine is shutdown.

17. The control system of claim 10, wherein the auxiliary engine has a load capacity approximately equal to the combined load of the alternator at the alternator load capacity and the compressor at the compressor load capacity.

18. The control system of claim 17, wherein the compressor load capacity corresponds to the maximum load of the compressor when the compressor is in a steady-state mode.

19. The control system of claim 10, wherein the controller is programmed to reduce the alternator load relative to the auxiliary engine in response to the detected compressor parameter.

20. The control system of claim 10, wherein the controller is programmed to simultaneously operate the alternator up to the alternator load capacity and the compressor up to a compressor load capacity.

* * * * *